United States Patent Office 3,262,973
Patented July 26, 1966

3,262,973
PREPARATION OF ALKALI METAL FORMATES
IN ALCOHOLIC MEDIUM
Edward A. Swakon, Hammond, Ind., assignor to Standard Oil Company, Chicago, Ill., a corporation of Illinois
No Drawing. Filed Nov. 20, 1963, Ser. No. 325,172
6 Claims. (Cl. 260—542)

This invention relates to a method of preparing alkali metal and ammonium formates.

At one time formic acid was prepared by the decarboxylation of oxalic acid, generally carried out in the presence of a polyhydroxy compound, such as glycerol; however, this once classical method is now obsolete, and formic acid is currently made from by-product alkali metal formates, e.g. sodium formate and an inorganic acid. One method of preparing sodium formate comprises slurrying hydrate lime and a sodium sulfate solution and then reacting this slurry with carbon monoxide. Another process involves the reaction of aqueous sodium hydroxide with producer gas containing about 33 percent carbon monoxide. This process is carried out continuously but is somewhat limited by the slow reaction of caustic with carbon monoxide. Even with countercurrent flow the reaction of producer gas with aqueous sodium hydroxide is conducted at 200 to 250 pounds per square inch pressure and at a temperature of about 160 to 200° C. The aqueous effluent liquor must be evaporated to dryness to obtain the sodium formate.

Sodium formate is also obtained as a by-product of a process of making pentaerythritol. In this process one mole of sodium formate is produced for each mole of pentaerythritol.

The direct synthesis of formic acid from carbon monoxide and water or steam has been proposed, but the thermodynamics of the reaction appear to be against the development of a commercially feasible formic acid synthesis.

It is now been discovered that alkali metal formates and ammonium formate can be conveniently and readily prepared in a crystalline form readily recoverable from the reaction mixture by reacting carbon monoxide with an alkali metal hydroxide or ammonium hydroxide dissolved in a lower alkanol, that is, an alkanol containing 1 to 4 carbon atoms. The alkanol is employed to maintain the alkali metal hydroxide or ammonium hydroxide in solution. The alkali metal hydroxides per se can be added to the alcohol solvent or they can be added to the alcohol solvent as aqueous solutions of the alkali metal hydroxide in the same manner that aqueous ammonium hydroxide would be added to the alcohol solvent.

For the purpose of this invention the carbon monoxide may be pure or may be present in mixtures in amounts as low as one-tenth volume percent. When such low concentrations of carbon monoxide are used the process of this invention can be used to remove carbon monoxide, for example from hydrocarbon streams containing such small amounts of carbon monoxide or from hydrogen streams containing such small amounts of carbon monoxide. The gas containing carbon monoxide may also contain some carbon dioxide but it must be kept in mind that the carbon dioxide would also react with the alkali metal hydroxide to form carbonates.

The process of this invention can also be carried out in a continuous manner by contacting in counter current flow a stream of lower alkanol containing alkali metal hydroxide or ammonium hydroxide with a gas stream containing carbon monoxide. The carbon monoxide spent gas is withdrawn from the reaction and a slurry of alkali metal or ammonium formate precipitate is recovered by any suitable means for separating a solid phase and a liquid phase, for example by decantation, filtration, centrifugation and other means for separating liquid and solid phases.

The temperature at which the alkali metal and ammonium formates dissolved in lower alkanol are reacted with carbon monoxide is not of importance except as a matter of convenienve. For example, at temperatures above the boiling point of the alcohol or aqueous alcohol solvent the reaction must be carried out in a closed system under a pressure to maintain the alcohol or aqueous alcohol in the liquid phase. However, the process of this invention can be conventiontly carried out at atmospheric pressure in open reaction apparatus at temperatures up to about the boiling point of the alkanol or aqueous alkanol solvent for the alkali metal or ammonium hydroxides. The formation of alkali metal and ammonium formates by the process of this invention is quite rapid at atmospheric pressure and temperatures as low as even 0° C. up to about the boiling point of the solvent medium. However, to avoid any heat input to the solvent, it is preferred to carry out the reaction at atmospheric pressure and at a temperature of from 10 to about 30° C.

In the process of this invention the function of the alcohol is to dissolve the alkali metal hydroxide and to provide a non-solvent for the alkali metal formate. Since ammonium formate is also insoluble in the lower alkanols the use of aqueous ammonium hydroxide and the lower alkanol also results in the precipitation of ammonium formate.

There are various sources of carbon monoxide available for the process of this invention. The source of carbon monoxide can include even such impurities as sulfur and sulfur compounds, water gas, producer gas, carbon monoxide from electric furnaces of ferroalloy plants and the gases from the recently developed oxygen assisted conversion of iron to steel which provide commercial quantities of carbon monoxide.

It has been found that carbon monoxide is substantially completely removed from a mixture containing 5 mole percent carbon monoxide and 95 mole percent hydrogen by contacting this mixture of gases with a solution containing 10 percent sodium hydroxide in ethanol. Even the presence of sulfur and/or hydrogen sulfide the gas did not prevent the formation of sodium formate as a precipitated product and had little or no effect on the removal of carbon monoxide from the feed gas mixture.

As alkali metal hydroxides there can be used lithium hydroxide, sodium hydroxide or potassium hydroxide. The amount of the alkali metal hydroxide or ammonium hydroxide in the alcohol solvent is only limited by the solvent incapacity of the alcohol for the alkali metal or ammonium hydroxide.

As hereinbefore indicated, the process of this invention can, if desired, be carried out at pressures above atmospheric pressures, for example, up to 1000 atmospheres. Also, the lower alkanol is not the only alcohol in which the alkali metal and ammonium formates are insoluble. Thus, other alcohols such as cyclohexanol, or furfuryl alcohol, benzyl alcohol among others at whch the alkali metal or ammonium formates are insoluble can be employed. However, as hereinbefore pointed out, the use of these other more costly alcohols is not necessary and the commercially feasible convenient, inexpensive process can be based on the $C_1$ to $C_4$ alkanols. Although the solubility of the alkali metal formates in the alcohols vary from alkali metal formate to alkali metal formate, once the alkanol solvent becomes saturated with respect to the alkali metal formate the remainder of the alkali metal formate forms as a precipitate. Thus, one does not need to recover all of the alkali metal formate made by the process of this invention, but after recovery of the precipitated alkali metal or ammonium formates by any one of the aforementioned phase separation means, the mother liquor can be merely recycled to the reaction.

Briefly, the process of this invention whether conducted as a batch process or a continuous process comprises introducing the source of carbon monoxide as for example synthesis gas (about 50% each of carbon monoxide and hydrogen), water gas, carbon monoxide containing gases from the manufacture of steel, refinery flue gases among other sources of carbon monoxide gases is contacted with an alcoholic solution of alkali metal hydroxide or ammonium hydroxide. The alkali metal formate or ammonium formate which precipitates is recovered as hereinbefore disclosed. The process of this invention will be more readily understood from the following illustrative examples.

*Example I*

Sodium formate is prepared by charging to a 300 ml. stainless steel autoclave 125 grams of the solution containing 8% by weight sodium hydroxide in ethanol. Thereafter the autoclave is sealed and carbon monoxide is pressured into the autoclave to a pressure of 800 pounds per square inch gauge (p.s.i.g.). The sealed autoclave is maintained at ambient room temperature, about 25–27° C. The drop in pressure which occurred over a period of 16 hours is recorded and the pressure drop with respect to time is:

| Reaction Time, min | 0 | 35 | 75 | 135 | 175 | ¹ 16 |
|---|---|---|---|---|---|---|
| CO Consumed, p.s.i. drop | 0 | 200 | 340 | 440 | 480 | 580 |

¹ Hours.

As the above data indicate, the pressure drops from 800 p.s.i.g. in 16 hours. The contents of the autoclave are filtered and there is recovered 16 grams of dry sodium formate by filtering the alcoholic solutions and drying the filter cake.

*Example II*

The process of Example I is repeated except that 125 grams of an 8% solution of potassium hydroxide in ethanol is used. In three hours at ambient room temperature a 340 p.s.i. pressure drop occurs. At this time the autoclave is opened and there is recovered 129 grams of a white hazy liquid and solid precipitate. This slurry is filtered and the filter cake dried. In this manner there is obtained 5 grams of potassium formate.

In contrast to the process of Example I the same amount of sodium hydroxide dissolved in water is charged to the autoclave and the sealed autoclave pressured to 800 p.s.i.g. with carbon monoxide. Only a 125 p.s.i. pressure drop occurred after 20 hours. Substantially all of this pressure drop could be accounted for by the solubility of carbon monoxide in water. By repeating this pressurizing of aqueous sodium hydroxide with carbon monoxide except after pressurizing the autoclave to 800 p.s.i.g. the contents are then heated to 200° F. A 440 p.s.i.g. pressure drop occurs. There is obtained 131 grams of clear liquid which represents a gain of about 6 grams.

Repeating the process of Example I except using methanol, isopropyl alcohol or butanol in place of ethanol there can be obtained substantially equivalent results allowing, of course, for the difference in solubility of sodium formate in these different alcohols.

*Example III*

Sodium formate is prepared continuously by pumping into one end of a tubular reactor a 10% sodium hydroxide solution in ethanol. At the opposite end of the tubular reactor there is introduced a gas stream containing 5 mole percent carbon monoxide and 95 mole percent hydrogen. The tubular reactor is provided with a liquid-gas separator at the upper portion thereof and the gas removed from the tubular reactor is collected in a gas holder. There is withdrawn from the lower portion of the tubular reactor a slurry of sodium formate with ethanol as the liquid portion of this slurry. The slurry is filtered to recover sodium formate and the mother liquor comprising a saturated solution of sodium formate in ethanol is charged to a sodium hydroxide dissolving vessel wherein a 10% solution of sodium hydroxide in the ethanol is again prepared for feed stream to the tubular reactor. In the foregoing manner the gas collected in the gas holder is substantially only hydrogen and a substantially quantitative yield of sodium formate based on the carbon monoxide charged is obtained at ambient temperature.

Potassium formate, lithium formate and ammonium formate can be readily and conveniently prepared by any one of the processes of the foregoing examples.

What is claimed is:

1. A method of preparing an alkali metal formate which comprises reacting carbon monoxide with an alkali metal hydroxide in an alkanol reaction medium at a temperature in the range of from 0° C. to about the atmospheric pressure boiling point of said reaction medium whereby an alkali metal formate precipitates from the reaction medium.

2. The method of claim 1 wherein the alkanol contains from 1 to 4 carbon atoms.

3. The method of claim 1 wherein the reaction is carried out at a temperature in the range of from 10 to 30° C.

4. The method of claim 3 wherein the alkanol reaction medium is ethanol and the alkali metal hydroxide is sodium hydroxide.

5. A method for the continuous preparation of an alkali metal formate which comprises continuously adding a stream of carbon monoxide and a stream of lower alkanol containing alkali metal hydroxide to a reaction zone at 10 to 30° C. whereby an alkali metal formate precipitates from the reaction medium, continuously withdrawing a slurry consisting essentially of alkanol and precipitated alkali metal formate from the reaction zone and separating the alkali metal formate from the withdrawn slurry.

6. A continuous method for the preparation and recovery of hydrogen gas and an alkali metal formate which comprises continuously contacting in a reaction zone a solution having 8 to 10% alkali metal hydroxide by weight dissolved in a $C_1$ to $C_4$ alkanol reaction medium at a temperature in the range of from 10 to 30° C. with hydrogen gas having as impurity from 0.1 to 5 mole percent carbon monoxide, removing from said reaction zone a gas stream consisting of hydrogen and a fluid stream consisting of a slurry of solid alkali metal formate in said reaction medium, collecting said gas stream consisting of hydrogen, separating said solid alkali metal formate from said slurry, recovering the liquid portion of said slurry, dissolving in the recovered liquid portion of said slurry alkali metal hydroxide in an amount to provide in the resulting solution said 8 to 10% by weight alkali metal hydroxide and recycling the resulting solution to the reaction zone.

References Cited by the Examiner

UNITED STATES PATENTS

| 2,070,503 | 2/1937 | Ammon | 260—542 X |
| 2,281,715 | 5/1942 | Rogers | 260—542 |

LORRAINE A. WEINBERGER, *Primary Examiner.*

LEON ZITVER, D. P. CLARKE, V. GARNER,
*Examiners.*